(12) United States Patent
Witczak et al.

(10) Patent No.: US 12,421,079 B2
(45) Date of Patent: Sep. 23, 2025

(54) ELEVATOR MONITORING DEVICE WITH VARYING WIRELESS TRANSMISSION POWER BASED ON ELEVATOR CAR POSITION

(71) Applicant: OTIS ELEVATOR COMPANY, Farmington, CT (US)

(72) Inventors: Tadeusz Pawel Witczak, Farmington, CT (US); Craig Drew Bogli, Avon, CT (US); Yrinee Michaelidis, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1542 days.

(21) Appl. No.: 16/866,758

(22) Filed: May 5, 2020

(65) Prior Publication Data
US 2021/0347602 A1 Nov. 11, 2021

(51) Int. Cl.
*B66B 1/34* (2006.01)
*B66B 3/00* (2006.01)
*B66B 5/02* (2006.01)
*H04W 52/28* (2009.01)

(52) U.S. Cl.
CPC .......... *B66B 1/3453* (2013.01); *B66B 1/3492* (2013.01); *B66B 3/002* (2013.01); *B66B 5/02* (2013.01); *H04W 52/283* (2013.01)

(58) Field of Classification Search
CPC ..... B66B 1/3453; B66B 1/3492; B66B 3/002; B66B 5/02; B66B 1/3446; B66B 5/0018; B66B 1/06; B66B 1/3423; H04W 52/283
See application file for complete search history.

(56) References Cited

U.S. PATENT DOCUMENTS

| | | | | | |
|---|---|---|---|---|---|
| 5,282,239 | A | * | 1/1994 | Yokoi | H04W 88/08 455/437 |
| 2002/0189907 | A1 | * | 12/2002 | Motoyama | B66B 1/3415 187/247 |
| 2014/0045479 | A1 | * | 2/2014 | Shinada | H04W 52/283 455/418 |

(Continued)

FOREIGN PATENT DOCUMENTS

| | | | |
|---|---|---|---|
| EP | 3578492 A1 | 12/2019 | |
| KR | 101141515 B1 | 5/2012 | |

(Continued)

OTHER PUBLICATIONS

European Search Report for Application No. 23 20 8890 dated Jan. 4, 2024.

*Primary Examiner* — Jeffrey Donels
(74) *Attorney, Agent, or Firm* — Carlson, Gaskey & Olds, P.C.

(57) ABSTRACT

An illustrative example embodiment of a device for communicating information regarding an elevator car that moves along a vertical path includes at least one sensing portion configured to be supported on the elevator car and to sense at least one characteristic of the elevator car. A transmitter is configured to transmit a wirelessly communicated output indicating at least one condition based on the sensed characteristic. The transmitter is configured to use a first transmit power when the device is at a first location along the vertical path and to use a second, different transmit power when the device is at a second, different location along the vertical path.

19 Claims, 3 Drawing Sheets

(56) References Cited

U.S. PATENT DOCUMENTS

2019/0373530 A1* 12/2019 Witczak ................ H04W 40/20
2023/0030084 A1*  2/2023 Belov et al. .......... B66B 1/3461
                                                      187/247

FOREIGN PATENT DOCUMENTS

KR         102058110  B1    12/2019
WO       2016126686  A1     8/2016

* cited by examiner

ELEVATOR MONITORING DEVICE WITH VARYING WIRELESS TRANSMISSION POWER BASED ON ELEVATOR CAR POSITION

BACKGROUND

Elevator systems include a variety of different components and moving parts. Keeping an elevator system operating in a desired manner typically requires maintenance or repair. Different systems have been utilized in the industry for monitoring the condition of an elevator system. One challenge associated with elevator monitoring systems that include wirelessly communicating devices is that the elevator environment is often not conducive to a straightforward implementation. The conditions in an elevator hoistway and the frequent movement of an elevator car pose challenges to those attempting to achieve reliable wireless communications.

SUMMARY

An illustrative example embodiment of a device for communicating information regarding an elevator car that moves along a vertical path includes at least one sensor configured to be supported on the elevator car and to sense at least one characteristic of the elevator car. A transmitter is configured to transmit a wirelessly communicated output indicating at least one condition based on the sensed characteristic. The transmitter is configured to use a first transmit power when the device is at a first location along the vertical path and to use a second, different transmit power when the device is at a second, different location along the vertical path.

In an example embodiment having at least one feature of the device of the previous paragraph, the transmitter is configured to use the first and second transmit powers when communicating with a gateway that the device moves relative to as the elevator car moves along the vertical path, the first location is closer to the gateway than the second location, and the second transmit power is greater than the first transmit power.

In an example embodiment having at least one feature of the device of any of the previous paragraphs, the transmitter is configured to use the first and second transmit powers when communicating with a gateway that the device moves relative to as the elevator car moves along the vertical path and configured to use a third transmit power when communicating with a mobile device that may be brought in close proximity to the transmitter and the third transmit power is lower than each of the first and second transmit powers.

An example embodiment having at least one feature of the device of any of the previous paragraphs includes a controller including a processor and memory. The memory includes indications of a plurality of transmit powers for a plurality of locations along the vertical path, the processor determines the location of the device along the vertical path, and the controller controls the transmitter to use the transmit power indicated in the memory for a current location of the device.

In an example embodiment having at least one feature of the device of any of the previous paragraphs, the controller is configured to determine the transmit power for a location along the vertical path using a power setting procedure comprising causing the transmitter to use a test transmit power to transmit a test communication to a gateway that the device moves relative to as the elevator car moves along the vertical path while the device is at the location, determining whether the gateway received the test communication. If the gateway received the test communication, repeatedly causing the transmitter to use a reduced test transmit power that is less than a most recently used test transmit power to transmit the test communication to the gateway from the device at the location, determining a lowest test transmit power at which the gateway received the test communication from the device at the location, and setting the transmit power for the location at the lowest test transmit power at which the gateway received the test communication from the device at the location.

In an example embodiment having at least one feature of the device of any of the previous paragraphs, the controller is configured to determine respective transmit powers for each of a plurality of locations along the vertical path using the power setting procedure when the device is at each of the plurality of locations.

In an example embodiment having at least one feature of the device of any of the previous paragraphs, the controller is configured to determine when the device is at a particular location where the transmitter is unable to successfully communicate information while using a transmit power within a selected range to a gateway that the device moves relative to as the elevator car moves along the vertical path and when the device is at the first or second location, cause the transmitter to provide information to the gateway regarding the particular location.

In an example embodiment having at least one feature of the device of any of the previous paragraphs, the transmitter is configured to pause communication from the transmitter when the device is at the particular location and transmit information regarding the at least one condition of the elevator car corresponding to the particular location when the device is at another location where wireless communication with the gateway is possible.

In an example embodiment having at least one feature of the device of any of the previous paragraphs includes a battery. The transmitter is configured to alter a manner in which the transmitter transmits information based on a change in a charge level of the battery and the transmitter is configured to alter the manner by at least one change selected from the group of changes consisting of changing a heartbeat duty cycle of communications to include longer pauses between communications, reducing a number of locations along the vertical path from which the wirelessly communicated output is transmitted, only transmitting when the device is at a location where the transmit power is below a low battery threshold transmit level, and sending a low battery indication when the battery charge level reaches a preselected threshold.

In an example embodiment having at least one feature of the device of any of the previous paragraphs, the transmitter transmits an alert indication at an alert transmit power that is higher than the first transmit power and higher than the second transmit power.

An illustrative example embodiment of an elevator system includes the device of any of the previous paragraphs supported on the elevator car and an elevator car controller that is configured to use information from the device to determine a location of the elevator car along the vertical path.

An illustrative example embodiment of a method of communicating information regarding an elevator car that moves along a vertical path includes sensing at least one characteristic of the elevator car using a sensor supported on the elevator car. The method includes transmitting a wirelessly communicated output using a first transmit power when the elevator car is at a first location along the vertical path and using a second, different transmit power when the elevator car is at a second, different location along the vertical path. The output indicates at least one condition based on the sensed characteristic.

An example embodiment having at least one feature of the method of the previous paragraph includes using the first and second transmit powers when communicating with a gateway that the device moves relative to as the elevator car moves along the vertical path. The first location is closer to the gateway than the second location and the second transmit power is greater than the first transmit power.

An example embodiment having at least one feature of the method of any of the previous paragraphs includes using the first and second transmit powers when communicating with a gateway that the device moves relative to as the elevator car moves along the vertical path and using a third transmit power when communicating with a mobile device that may be brought in close proximity to the transmitter. The third transmit power is lower than each of the first and second transmit powers.

An example embodiment having at least one feature of the method of any of the previous paragraphs includes determining the transmit power for a location along the vertical path using a power setting procedure including using a test transmit power to transmit a test communication to a gateway that the device moves relative to as the elevator car moves along the vertical path while the elevator car is at the location, determining whether the gateway received the test communication, if the gateway received the test communication, repeatedly using a reduced test transmit power that is less than a most recently used test transmit power to transmit the test communication to the gateway while the elevator car is at the location, determining a lowest test transmit power at which the gateway received the test communication while the elevator car is at the location, and setting the transmit power for the location at the lowest test transmit power at which the gateway received the test communication while the elevator car is at the location.

An example embodiment having at least one feature of the method of any of the previous paragraphs includes determining respective transmit powers for each of a plurality of locations along the vertical path using the power setting procedure when the elevator car is at each of the plurality of locations.

An example embodiment having at least one feature of the method of any of the previous paragraphs includes determining when the elevator car is at a particular location where wireless communications with a gateway that the device moves relative to as the elevator car moves along the vertical path are unsuccessful using a transmit power within a selected range and when the elevator car is at the first or second location, wirelessly communicating information to the gateway regarding the particular location.

An example embodiment having at least one feature of the method of any of the previous paragraphs includes pausing transmission of the wirelessly communicated output when the elevator car is at the particular location and transmitting information regarding the at least one condition of the elevator car corresponding to the particular location when the elevator is at another location where wireless communication with the gateway is possible.

An example embodiment having at least one feature of the method of any of the previous paragraphs includes altering a manner in which the wirelessly communicated output is transmitted based on a change in a charge level of a battery and altering the manner by implementing at least one change selected from the group of changes consisting of changing a heartbeat duty cycle of communications to include longer pauses between communications, reducing a number of locations along the vertical path from which the wirelessly communicated output is transmitted, only transmitting when the device is at a location where the transmit power is below a low battery threshold transmit level and sending a low battery indication when the battery charge level reaches a preselected threshold.

An example embodiment having at least one feature of the method of any of the previous paragraphs includes transmitting an alert indication at an alert transmit power that is higher than the first transmit power and higher than the second transmit power.

The various features and advantages of at least one disclosed example embodiment will become apparent to those skilled in the art from the following detailed description. The drawings that accompany the detailed description can be briefly described as follows.

DETAILED DESCRIPTION

Figure 1:
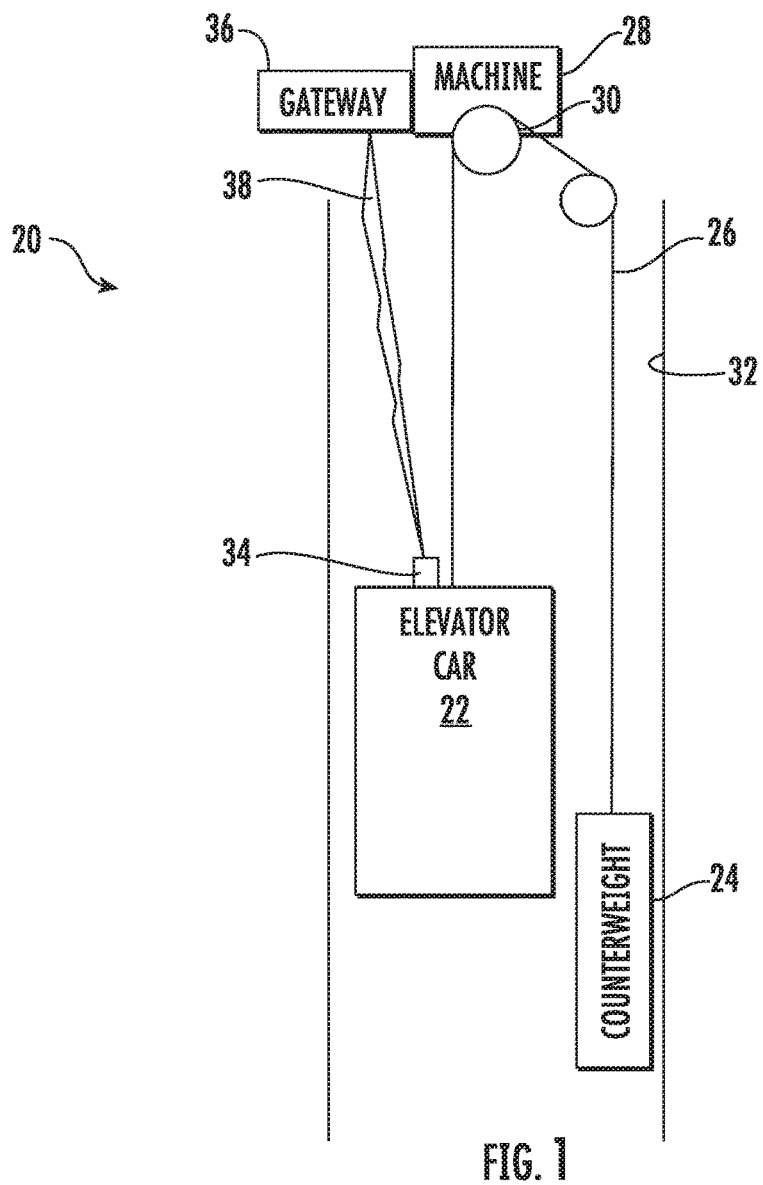
FIG. 1 schematically illustrates selected portions of an elevator system.

FIG. 1 schematically illustrates selected portions of an elevator system 20. An elevator car 22 is associated with a counterweight 24 by roping 26. In some embodiments, the roping 26 includes round steel ropes while in others it includes flat belts. A machine 28 causes rotation of a traction sheave 30 that moves the roping 26 to control movement of the elevator car 22 along a vertical path 32.

A device 34 for communicating information regarding the elevator car 22 is supported on the elevator car 22. The device 34 moves with the elevator car 22 along the vertical path 32. The device 34 includes at least one sensor that gathers information regarding the performance of at least one aspect or component of the elevator car 22. The device 34 provides an output to a gateway 36 using wireless communication schematically represented at 38. The gateway 36 is configured to communicate with a monitoring system or device that an elevator service provider, for example, uses for gathering information regarding the operation of the elevator system 20. The monitoring system may be local to the site of the elevator system 20, such as in the same building, or remotely located such that the gateway 36 communicates with the monitoring system over the Internet or dedicated communication channels. The communications between the gateway 36 and the monitoring system may occur wirelessly or over physical communication lines through hard-wired connections.

Figure 2:
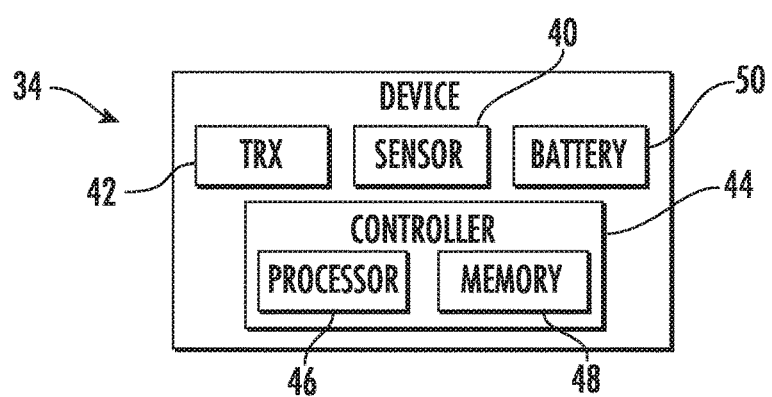
FIG. 2 schematically illustrates an example device designed according to an embodiment of this invention.

FIG. 2 schematically illustrates an example configuration of the device 34. At least one sensor 40 senses at least one characteristic of the operation of the elevator car 22. The sensor 40 in some embodiments may include an accelerometer, air pressure sensor, temperature sensor, camera, pressure sensor, strain gauge, microphone, or any other known sensing device. The sensor 40 senses characteristics, such as vibration of the elevator car 22 during movement, vibration during movement of the elevator car doors, noises associated with car movement or door movement, for example. The particular characteristics of interest may vary depending on the configuration of the elevator car 22 or the elevator system 20 and those skilled in the art who have the benefit of this description will be able to select an appropriate sensor configuration to gather the information needed for their particular installation.

A transmitter 42 wirelessly communicates information gathered by the sensor 40 to the gateway 36. In this example, the transmitter 42 is part of a transceiver (TRX) that is also capable of receiving wireless communications from the gateway 36.

A controller 44 controls when the transmitter 42 provides an output to the gateway 36. The controller 44 includes a processor 46 and associated memory 48. One reason why the controller 44 controls the operation of the transmitter 42 is to conserve energy of a battery 50 that provides power for the device 34. Having a battery powered device 34 makes installing the device 34 less complicated and more economical than it would typically be if it were necessary to tap into power provided to the elevator car 22 or some other wired power source.

Figure 3:
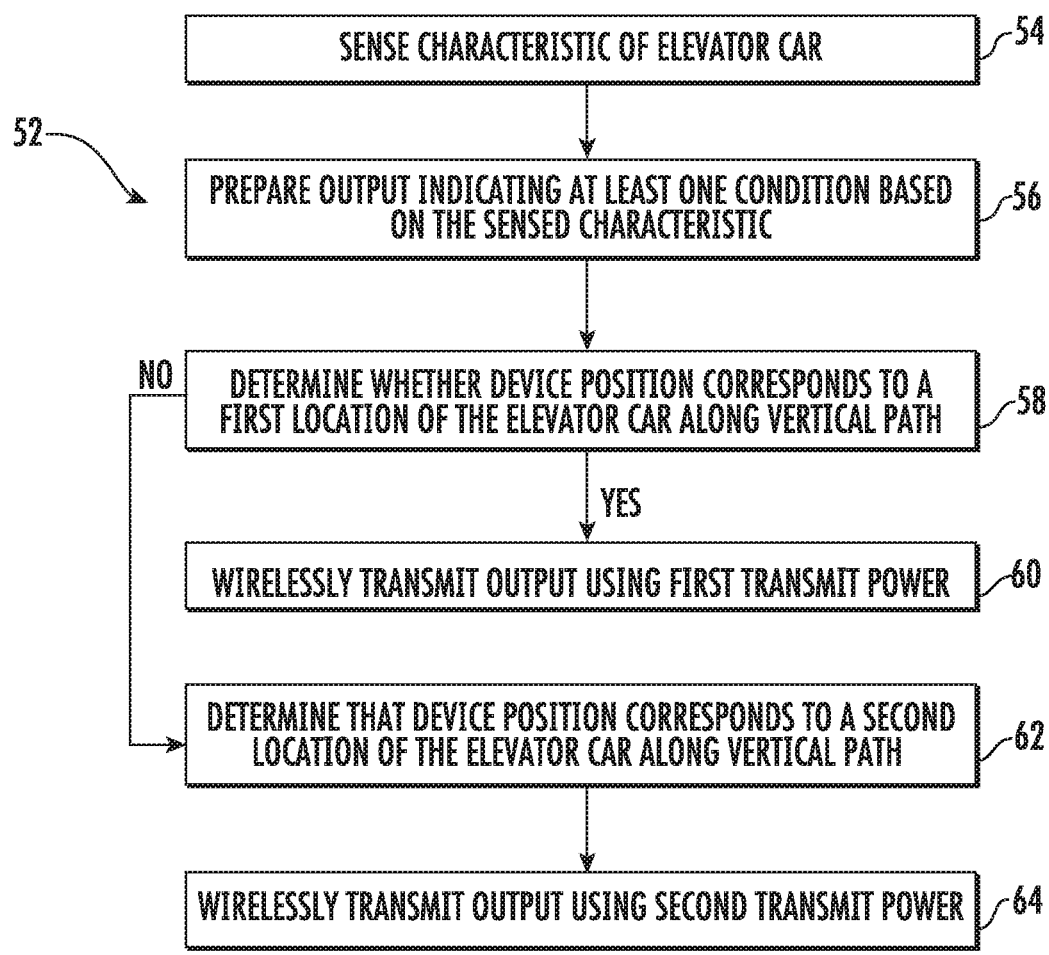
FIG. 3 is a flowchart diagram summarizing an example method of communicating information regarding at least one condition of an elevator car.

The controller 44 controls operation of the transmitter 42 to control the transmit power used by the device 34 depending on the location of the device 34, which is based on the position of the elevator car 22 along the vertical path 32. FIG. 3 includes a flowchart diagram 52 summarizing an example approach. At 54, the sensor 40 senses at least one characteristic of the elevator car 22, for example, during a run between landings along the vertical path 32. At 56, the processor 46 prepares an output indicating at least one condition of the elevator car 22 based on the sensed characteristic. For example, when the sensor 40 provides an indication of vibration during elevator car movement, the output will correspond to or indicate the amount of vibration, which may be useful for diagnosing the condition of guide rollers on the elevator car 22.

At 58, the processor 46 determines whether the device 34 is at a position that corresponds to a first location of the elevator car 22 along the vertical path 32. If the device 34 is at the first position, then the controller 44 causes the transmitter 42 to wirelessly transmit the output to the gateway 36 using a first transmit power at 60. In the event that the elevator car 22 and the device 34 are not at the first location, the processor 46 determines that the device position corresponds to a second location of the elevator car 22 along the vertical path 32 at 62. With the device at 34 at the second location, the transmitter 42 wirelessly communicates the output using a second transmit power at 64.

Controlling the power used by the transmitter 42 depending on the location of the device 34 along the vertical path 32 facilitates conserving the energy of the battery 50 by, for example, using the lowest amount of transmit power needed to effectively wirelessly communicate the output from the device 34 to the gateway 36. Different locations along the vertical path 32 will require different transmit powers to achieve reliable wireless communication. For example, when the elevator car 22 and, correspondingly, the transmitter 42 are closer to the gateway 36, less transmitting power will be needed. Conversely, when the elevator car 22 and the transmitter 42 are further from the gateway 36, more transmitting power will be needed.

Figure 4:
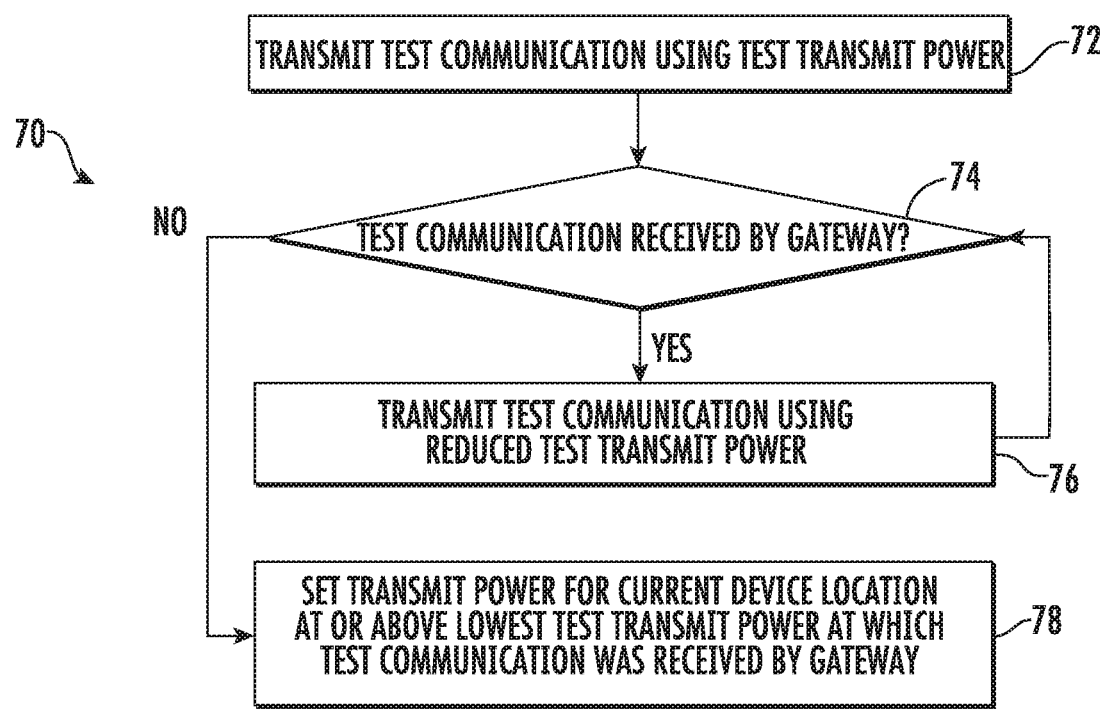
FIG. 4 is a flowchart diagram schematically illustrating a power setting procedure useful in an example embodiment.

FIG. 4 is a flowchart diagram 70 that summarizes an example approach for setting the transmit power at different locations along the vertical path 32. For example, there will be a plurality of landings at which the elevator car 22 stops to provide elevator service. The device 34 in some embodiments is configured to transmit an output to the gateway 36 each time the elevator car 22 stops at a landing. In other embodiments, the device 34 transmits on a preset time schedule or at a plurality of locations along the vertical path 32 including locations that are distinct from those that correspond to the elevator car 22 being at a landing. Such an output will provide information regarding the characteristic(s) sensed by the sensor 40 during that elevator run.

Using the power setting procedure summarized in FIG. 4, the controller 44 causes the transmitter 42 to transmit a test communication using a test transmit power at 72 while the elevator car 22 is at a predetermined location along the vertical path 32, such as being parked at a landing or a predetermined location from which transmissions are desirable. The gateway 36 provides an acknowledgement to the device 34 when the test communication is received by the gateway 36. At 74, the processor 46 determines whether the test communication was received by the gateway. If so, then the controller 44 causes the transmitter 42 to transmit the test communication using a reduced test transmit power at 76. If that communication was received by the gateway 36 as determined at 74, a further reduced test transmit power is used to transmit the test communication to the gateway 36. As long as the gateway 36 provides an acknowledgement of the test communication, the controller 44 continues to cause transmissions using a reduced test transmit power that is lower than the most recently used test transmit power.

Eventually, the test transmit power will be too weak for the gateway 36 to receive the test communication. The processor 46 determines when this occurs, for example, by the lack of an acknowledgement received from the gateway 36 after the test communication has been wirelessly transmitted at a particular test transmit power. At 78, the controller 44 sets the transmit power for the current location of the device 34 at one of the transmit powers at which the test communication was received by the gateway 36. In some embodiments, the transmit power for the current location of the device 34 will be set to be at least one increment above the lowest transmit power that resulted in the gateway successfully receiving the test communication. Using a lower transmit power in general will conserve the energy of the battery 50 and, therefore, is generally preferred.

The same procedure summarized by the flowchart 70 is performed at each of a plurality of locations along the vertical path 32. The processor 46 determines a transmit power to be used by the device 34 at each of those locations and stores those transmit powers in the memory 48 for purposes of subsequently controlling the transmit power used by the transmitter 42 at each location. At the end of the power setting procedure for each such location, the memory 48 contains information, such as a look up table, of respective transmit powers to be used at different locations along the vertical path 32.

Utilizing different transmit powers at different locations within the elevator system 20 accounts for different needs to effectively wirelessly communicate with the gateway 36 at those locations. For example, when the elevator car 22 and the device 34 are at a location that is relatively close to the gateway 36, less transmit power is needed compared to the amount of transmit power required when the elevator car 22 and device 34 are further from the gateway 36. Additionally, there may be locations within the elevator system 20 where communications are interfered with based upon other components of the elevator system 20 or the building configuration, for example. Such locations may require higher transmit power even though they are physically closer to the gateway 36 compared to other locations along the vertical path 32. The controller 44 in the illustrated example embodiment controls the transmit power of the transmitter 42 accordingly.

In some situations, there may be locations along the vertical path 32 where effective communication with the gateway 36 is not possible or practical using a transmit power within a desired range. For example, there may be locations along an elevator hoistway where there is enough interference with wireless communication from the device 34 to the gateway 36 that it would be better to not transmit from the device 34 at such a location to conserve battery power. In the illustrated example embodiment, the controller 44 does not cause any transmission from the device 34 at such locations. Instead, the controller 44 causes the output generated by the processor 46 for that location to be transmitted to the gateway 36 the next time that the elevator car 22 is at a location where wireless communications are acceptable. In some embodiments, the device 34 provides information to the gateway 36 regarding locations along the vertical path 32 from which no communication should be expected from the device 34. This approach provides information indicating that the device 34 is not malfunctioning, for example, when the gateway 36 does not receive anything from the device 34 even though the elevator car 22 has stopped.

In some embodiments, the transmit powers stored in the memory 48 are provided to the gateway 36 so that an elevator monitoring device or elevator service provider may have information regarding the places along the vertical path 32 where no transmission is expected from the device 34. In some embodiments, the gateway 36 or the elevator service provider does not have stored information regarding no-transmission locations along the vertical path 32 and the device 34 provides an indication when it is entering a location where no output will be provided as a warning that there will be an absence of wireless communication.

The controller 44 is also capable of modifying the transmit power utilized by the transmitter 42 under some conditions that only temporarily exist. For example, when an elevator service technician or mechanic is at the site of the elevator system 20, that individual may have a mobile station, such as a smart phone or hand-held device, that is capable of communicating directly with the device 34. When that individual is inside the elevator car 22, for example, a much lower transmit power will be effective for communicating with that individual's mobile station. The controller 44 in this example causes the transmitter 42 to use a third transmit power that is lower than the first and second transmit power mentioned above. Using a lower, third transmit power further conserves the energy of the battery 50 and protects against such communications being intercepted by another device other than an authorized individual's mobile station.

The controller 44 also controls the transmitter 42 to use a higher transmit power than any of the set transmit powers for the various locations along the vertical path 32 when a particular alarm or alert condition has to be communicated by the device 34 to the gateway 36. Using a higher, alert transmit power ensures that an urgent communication will be received by the gateway 36. Since such transmissions are only expected occasionally or under rare circumstances, using a higher alert transmit power at such times is not expected to place any significant burden on the battery 50.

The controller 44 also adjusts the transmit power used by the transmitter 42 when the charge level of the battery 50 changes. For example, over time, the battery 50 will lose charge and the controller 44 alters how the transmitter 42 transmits information based on such a change in the charge level of the battery. One way to alter the manner in which the transmitter transmits information includes changing a heartbeat duty cycle of communications to include longer pauses between them so that fewer communications are used over time until the battery charge may be replenished or the battery 50 is replaced. Another approach includes reducing a number of locations along the vertical path 32 from which the device 34 communicates with the gateway 36. For example, the transmitter 42 will only transmit from locations where a low transmit power is sufficient when the battery charge is low. For example, the controller 44 determines whether the transmit power for a current location is below a low battery threshold power and only causes the transmitter 42 to transmit when the transmit power is below that threshold. In some embodiments, the device 34 sends a low battery indication to the gateway 36 when the battery charge level reaches a preselected threshold.

The sensor 40 in some embodiments is capable of sensing the motion of the elevator car 22 in a manner that provides information regarding the position of the elevator car 22 along the vertical path 32. Such information may be used as a supplement, for example, to the way in which the elevator system 20 keeps track of the position of the elevator car 22. Additionally, the different transmit powers used by the device 34 provide an indication of the position of the elevator car 22 along the vertical path 32 when the different powers for different locations from the memory 48 are provided to the gateway 36. The device 34 is therefore useful to supplement or enhance determinations regarding the position of the elevator car 22 along the vertical path 32 when that would be useful or necessary.

Embodiments of this invention provide the capability of utilizing an Internet of things approach to communicate information regarding the condition or performance of an elevator car or its components. Strategically controlling the transmit power from a monitoring device provides useful information in a way that is reliable while conserving battery power.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for communicating information regarding an elevator car that moves along a vertical path, the device comprising:
at least one sensor configured to be supported on the elevator car and to sense at least one characteristic of the elevator car;
a transmitter configured to transmit a wirelessly communicated output indicating at least one condition based on the sensed characteristic, the transmitter being configured to use a first transmit power when the device is at a first location along the vertical path and to use a second, different transmit power when the device is at a second, different location along the vertical path;
wherein the transmitter is powered from a power source such that power from the power source is conserved in response to changing between the first transmit power and the second transmit power;

wherein the transmitter is configured to use the first and second transmit powers when communicating with a gateway that the device moves relative to as the elevator car moves along the vertical path and configured to use a third transmit power when communicating with a mobile device that may be brought in close proximity to the transmitter; and the third transmit power is lower than each of the first and second transmit powers.

2. The device of claim 1, wherein
the transmitter is configured to use the first and second transmit powers when communicating with a gateway that the device moves relative to as the elevator car moves along the vertical path,
the first location is closer to the gateway than the second location, and
the second transmit power is greater than the first transmit power.

3. The device of claim 1, comprising a controller including a processor and memory and wherein
the memory includes indications of a plurality of transmit powers for a plurality of locations along the vertical path,
the processor determines the location of the device along the vertical path, and
the controller controls the transmitter to use the transmit power indicated in the memory for a current location of the device.

4. An elevator system comprising:
the device of claim 1 supported on the elevator car, and
an elevator car controller that is configured to use information from the device to determine a location of the elevator car along the vertical path.

5. The device of claim 1, wherein the power source comprises a battery that provides a first battery power level for the first transmit power and a second battery power level for the second transmit power.

6. A device for communicating information regarding an elevator car that moves along a vertical path, the device comprising:
at least one sensor configured to be supported on the elevator car and to sense at least one characteristic of the elevator car;
a transmitter configured to transmit a wirelessly communicated output indicating at least one condition based on the sensed characteristic, the transmitter being configured to use a first transmit power when the device is at a first location along the vertical path and to use a second, different transmit power when the device is at a second, different location along the vertical path;
wherein the transmitter is powered from a power source such that power from the power source is conserved in response to changing between the first transmit power and the second transmit power;
a controller including a processor and memory and wherein
the memory includes indications of a plurality of transmit powers for a plurality of locations along the vertical path,
the processor determines the location of the device along the vertical path, and
the controller controls the transmitter to use the transmit power indicated in the memory for a current location of the device;
wherein the controller is configured to determine the transmit power for a location along the vertical path using a power setting procedure comprising:
causing the transmitter to use a test transmit power to transmit a test communication to a gateway that the device moves relative to as the elevator car moves along the vertical path while the device is at the location,
determining whether the gateway received the test communication,
if the gateway received the test communication, repeatedly causing the transmitter to use a reduced test transmit power that is less than a most recently used test transmit power to transmit the test communication to the gateway from the device at the location,
determining a lowest test transmit power at which the gateway received the test communication from the device at the location, and
setting the transmit power for the location at the lowest test transmit power at which the gateway received the test communication from the device at the location.

7. The device of claim 6, wherein the controller is configured to determine respective transmit powers for each of a plurality of locations along the vertical path using the power setting procedure when the device is at each of the plurality of locations.

8. A device for communicating information regarding an elevator car that moves along a vertical path, the device comprising:
at least one sensor configured to be supported on the elevator car and to sense at least one characteristic of the elevator car;
a transmitter configured to transmit a wirelessly communicated output indicating at least one condition based on the sensed characteristic, the transmitter being configured to use a first transmit power when the device is at a first location along the vertical path and to use a second, different transmit power when the device is at a second, different location along the vertical path,
a controller including a processor and memory, wherein the memory includes indications of a plurality of transmit powers for a plurality of locations along the vertical path, and wherein the processor determines the location of the device along the vertical path;
the controller controls the transmitter to use the transmit power indicated in the memory for a current location of the device;
wherein the controller is configured to:
determine when the device is at a particular location where the transmitter is unable to successfully communicate information while using a transmit power within a selected range to a gateway that the device moves relative to as the elevator car moves along the vertical path; and
when the device is at the first or second location, cause the transmitter to provide information to the gateway regarding the particular location.

9. The device of claim 8, wherein the transmitter is configured to
pause communication from the transmitter when the device is at the particular location, and
transmit information regarding the at least one condition of the elevator car corresponding to the particular location when the device is at another location where wireless communication with the gateway is possible.

10. A device for communicating information regarding an elevator car that moves along a vertical path, the device comprising:
　at least one sensor configured to be supported on the elevator car and to sense at least one characteristic of the elevator car;
　a transmitter configured to transmit a wirelessly communicated output indicating at least one condition based on the sensed characteristic, the transmitter being configured to use a first transmit power when the device is at a first location along the vertical path and to use a second, different transmit power when the device is at a second, different location along the vertical path; and
　comprising a battery,
　wherein
　the transmitter is configured to alter a manner in which the transmitter transmits information based on a change in a charge level of the battery, and
　the transmitter is configured to alter the manner by at least one change selected from a group of changes consisting of
　changing a heartbeat duty cycle of communications to include longer pauses between communications,
　reducing a number of locations along the vertical path from which the wirelessly communicated output is transmitted,
　only transmitting when the device is at a location where the transmit power is below a low battery threshold transmit level, and
　sending a low battery indication when the battery charge level reaches a preselected threshold.

11. A device for communicating information regarding an elevator car that moves along a vertical path, the device comprising:
　at least one sensor configured to be supported on the elevator car and to sense at least one characteristic of the elevator car;
　a transmitter configured to transmit a wirelessly communicated output indicating at least one condition based on the sensed characteristic, the transmitter being configured to use a first transmit power when the device is at a first location along the vertical path and to use a second, different transmit power when the device is at a second, different location along the vertical path; and
　wherein the transmitter transmits an alert indication at an alert transmit power that is higher than the first transmit power and higher than the second transmit power.

12. A method of communicating information regarding an elevator car that moves along a vertical path, the method comprising:
　sensing at least one characteristic of the elevator car, using a sensor supported on the elevator car; and
　transmitting a wirelessly communicated output using a first transmit power when the elevator car is at a first location along the vertical path and using a second, different transmit power when the elevator car is at a second, different location along the vertical path, the output indicating at least one condition based on the sensed characteristic;
　powering the wirelessly communicated output from at least one battery such that battery power is conserved in response to changing between a first battery power level for the first transmit power and a second battery power level for the second transmit power;
　providing a device that is supported on the elevator car, and further comprising:
　determining when the elevator car is at a particular location where wireless communications with a gateway that the device moves relative to as the elevator car moves along the vertical path are unsuccessful using a transmit power within a selected range; and
　when the elevator car is at the first or second location, wirelessly communicating information to the gateway regarding the particular location.

13. The method of claim 12, including providing a device that is supported on the elevator car, and using the first and second transmit powers when communicating with a gateway that the device moves relative to as the elevator car moves along the vertical path, wherein
　the first location is closer to the gateway than the second location, and
　the second transmit power is greater than the first transmit power.

14. The method of claim 12, comprising
　pausing transmission of the wirelessly communicated output when the elevator car is at the particular location, and
　transmitting information regarding the at least one condition of the elevator car corresponding to the particular location when the elevator is at another location where wireless communication with the gateway is possible.

15. A method of communicating information regarding an elevator car that moves along a vertical path, the method comprising: sensing at least one characteristic of the elevator car, using a sensor supported on the elevator car; and transmitting a wirelessly communicated output using a first transmit power when the elevator car is at a first location along the vertical path and using a second, different transmit power when the elevator car is at a second, different location along the vertical path, the output indicating at least one condition based on the sensed characteristic; and
　powering the wirelessly communicated output from at least one battery such that battery power is conserved in response to changing between a first battery power level for the first transmit power and a second battery power level for the second transmit power;
　providing a device that is supported on the elevator car, the device including a transmitter, and further comprising:
　using the first and second transmit powers when communicating with a gateway that the device moves relative to as the elevator car moves along the vertical path; and
　using a third transmit power when communicating with a mobile device that may be brought in close proximity to the transmitter;
　wherein the third transmit power is lower than each of the first and second transmit powers.

16. A method of communicating information regarding an elevator car that moves along a vertical path, the method comprising: sensing at least one characteristic of the elevator car, using a sensor supported on the elevator car; and transmitting a wirelessly communicated output using a first transmit power when the elevator car is at a first location along the vertical path and using a second, different transmit power when the elevator car is at a second, different location along the vertical path, the output indicating at least one condition based on the sensed characteristic; and
　powering the wirelessly communicated output from at least one battery such that battery power is conserved in response to changing between a first battery power level for the first transmit power and a second battery power level for the second transmit power;

providing a device that is supported on the elevator car, and further comprising determining the transmit power for a location along the vertical path using a power setting procedure including
using a test transmit power to transmit a test communication to a gateway that the device moves relative to as the elevator car moves along the vertical path while the elevator car is at the location,
determining whether the gateway received the test communication,
if the gateway received the test communication, repeatedly using a reduced test transmit power that is less than a most recently used test transmit power to transmit the test communication to the gateway while the elevator car is at the location,
determining a lowest test transmit power at which the gateway received the test communication while the elevator car is at the location, and
setting the transmit power for the location at the lowest test transmit power at which the gateway received the test communication while the elevator car is at the location.

17. The method of claim 16, comprising determining respective transmit powers for each of a plurality of locations along the vertical path using the power setting procedure when the elevator car is at each of the plurality of locations.

18. A method of communicating information regarding an elevator car that moves along a vertical path, the method comprising: sensing at least one characteristic of the elevator car, using a sensor supported on the elevator car; transmitting a wirelessly communicated output using a first transmit power when the elevator car is at a first location along the vertical path and using a second, different transmit power when the elevator car is at a second, different location along the vertical path, the output indicating at least one condition based on the sensed characteristic;
powering the wirelessly communicated output from at least one battery such that battery power is conserved in response to changing between a first battery power level for the first transmit power and a second battery power level for the second transmit power;
providing a device that is supported on the elevator car, and further comprising
altering a manner in which the wirelessly communicated output is transmitted based on a change in a charge level of a battery; and
altering the manner by implementing at least one change selected from a group of changes consisting of
changing a heartbeat duty cycle of communications to include longer pauses between communications,
reducing a number of locations along the vertical path from which the wirelessly communicated output is transmitted,
only transmitting when the device is at a location where the transmit power is below a low battery threshold transmit level, and
sending a low battery indication when the battery charge level reaches a preselected threshold.

19. A method of communicating information regarding an elevator car that moves along a vertical path, the method comprising: sensing at least one characteristic of the elevator car, using a sensor supported on the elevator car; and transmitting a wirelessly communicated output using a first transmit power when the elevator car is at a first location along the vertical path and using a second, different transmit power when the elevator car is at a second, different location along the vertical path, the output indicating at least one condition based on the sensed characteristic;
powering the wirelessly communicated output from at least one battery such that battery power is conserved in response to changing between a first battery power level for the first transmit power and a second battery power level for the second transmit power; and
transmitting an alert indication at an alert transmit power that is higher than the first transmit power and higher than the second transmit power.

* * * * *